(12) United States Patent
Wang

(10) Patent No.: US 8,761,947 B2
(45) Date of Patent: Jun. 24, 2014

(54) SYSTEM AND METHOD FOR REDUCING LATERAL VIBRATION IN ELEVATOR SYSTEMS

(75) Inventor: Yebin Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 785 days.

(21) Appl. No.: 12/827,332

(22) Filed: Jun. 30, 2010

(65) Prior Publication Data
US 2012/0004777 A1 Jan. 5, 2012

(51) Int. Cl.
| | |
|---|---|
| G06F 19/00 | (2011.01) |
| G05D 9/00 | (2006.01) |
| G05D 23/00 | (2006.01) |
| G05D 7/00 | (2006.01) |
| B66F 9/06 | (2006.01) |
| B66F 9/08 | (2006.01) |
| B66B 1/34 | (2006.01) |

(52) U.S. Cl.
USPC ......... 700/280; 187/228; 187/229; 187/238; 187/292; 700/108; 700/148; 700/170; 700/174; 700/281; 700/283

(58) Field of Classification Search
USPC .......... 187/228, 229, 238, 292; 700/108, 148, 700/170, 174, 281, 283
See application file for complete search history.

(56) References Cited

U.S. PATENT DOCUMENTS

| | | | | |
|---|---|---|---|---|
| 4,042,069 | A * | 8/1977 | Ohira et al. | 187/296 |
| 4,225,014 | A * | 9/1980 | Wheeler | 187/411 |
| 4,879,056 | A * | 11/1989 | Filisko et al. | 252/74 |
| 5,032,308 | A * | 7/1991 | Knobel et al. | 252/74 |
| 5,071,157 | A * | 12/1991 | Majeed | 280/5.515 |
| 5,124,626 | A * | 6/1992 | Thoen | 318/610 |
| 5,243,155 | A * | 9/1993 | Sirag, Jr. | 187/392 |
| 5,255,759 | A * | 10/1993 | Kasai et al. | 187/413 |
| 5,289,902 | A | 3/1994 | Fujita | |
| 5,446,648 | A * | 8/1995 | Abramovitch et al. | 700/53 |
| 5,541,832 | A * | 7/1996 | Nakajima et al. | 700/28 |
| 5,715,158 | A * | 2/1998 | Chen | 700/30 |
| 5,859,395 | A * | 1/1999 | Fargo | 187/316 |
| 5,866,861 | A * | 2/1999 | Rajamani et al. | 187/292 |
| 6,062,347 | A * | 5/2000 | Traktovenko | 187/410 |
| 6,780,343 | B2 * | 8/2004 | Hata et al. | 252/62.52 |
| 7,007,774 | B2 | 3/2006 | Utsunomiya | |
| 7,272,823 | B2 * | 9/2007 | Ball | 717/125 |
| 7,401,683 | B2 * | 7/2008 | Husmann et al. | 187/292 |

(Continued)

FOREIGN PATENT DOCUMENTS

| | | |
|---|---|---|
| JP | 07-002456 | 6/1993 |
| JP | 06-191746 | 12/1994 |

(Continued)

*Primary Examiner* — Kavita Padmanabhan
*Assistant Examiner* — Thomas Stevens
(74) *Attorney, Agent, or Firm* — Dirk Brinkman; Gene Vinokur

(57) ABSTRACT

A system and method reduce lateral movement of a car in an elevator system by detecting vibration of the car as a vibration signal. A damping coefficient for a feedback signal is determined according to the vibration signal and a state of the elevator system. A semi-active actuator is arranged between the car and a roller guide assembly. The semi-active actuator includes a rheological fluid, and flow characteristics of the rheological fluid are actuated according to the feedback signal to reduce the lateral movement of the car.

13 Claims, 7 Drawing Sheets

(56) References Cited

U.S. PATENT DOCUMENTS

| | | | |
|---|---|---|---|
| 7,909,141 B2 * | 3/2011 | Utsunomiya | 187/292 |
| 2003/0006395 A1 * | 1/2003 | Hata et al. | 252/62.51 R |
| 2003/0050735 A1 * | 3/2003 | Griffis | 700/255 |
| 2005/0151350 A1 * | 7/2005 | Watson | 280/602 |
| 2006/0106500 A1 * | 5/2006 | Allaei | 700/280 |
| 2006/0207835 A1 | 9/2006 | Kulak | |
| 2007/0000732 A1 * | 1/2007 | Kulak et al. | 187/346 |
| 2009/0294222 A1 | 12/2009 | Piech | |
| 2009/0308696 A1 | 12/2009 | Utsunomiya | |

FOREIGN PATENT DOCUMENTS

| | | |
|---|---|---|
| JP | 0649810 A2 | 4/1995 |
| JP | 2003-104655 | 9/2003 |
| WO | 2006137113 A1 | 12/2009 |

* cited by examiner

SYSTEM AND METHOD FOR REDUCING LATERAL VIBRATION IN ELEVATOR SYSTEMS

FIELD OF THE INVENTION

This invention relates generally reducing vibration in elevator systems, and more particularly to reducing lateral vibration in elevator cars.

BACKGROUND OF INVENTION

An elevator system typically includes a car, a frame, roller guide assembly, and guide rails mounted in a hoistway. The car and roller guide assembly are mounted on the frame. The car and frame move along the guide rails with the movement of roller guide assembly.

Vibration in elevator systems are due to many sources, such as deformation of the guide rails, aerodynamic forces, and passenger load. This invention is particularly concerned with reducing lateral vibration induced by a distortion or misalignment of the guide rails. When the elevator moves sufficiently fast, level variation or winding of the guide rails can induce significant lateral movements of the frame and the car, which lead to discomfortness for the riders. Better ride quality usually imposes higher requirement on the installation of guide rails, and thus increase the cost of installation and maintenance. Tradeoffs have to be made between the system cost and the ride comfort during the design of an elevator system.

A conventional passive vibration reduction system of an elevator includes springs and rubbers, whose parameters, i.e., stiffness and damping coefficients, are fixed and designed according to a selected performance index and an intended operation situation. The passive design suffers either undesirable ride quality or stringent installation accuracy of guide rails. To improve the ride comfort, fully active vibration devices were developed to allow the versatility of suspension forces reacting to the vibration. Due to its capability to track the reference force, which is computed by a controller to meet higher ride quality, a fully active actuator can attenuate the vibration better. For instance, prior work disclosed an active vibration reduction device using an electromagnetic actuator U.S. Pat. No. 7,007,774. Since the active actuator can remove or transfer energy to elevator system, the durability and the cost of a fully active vibration reduction system are major concerns, albeit it can provide desirable performance on the vibration attenuation.

To provide a better trade-off between cost and performance, semi-active vibration reduction devices are known in the art. A semi-active actuator, which allows for the adjustment of actuator parameter, such as viscous damping coefficient or stiffness, is employed to achieve the majority of performance as the fully active actuator does but at a lower cost and improved reliability. In fact, the resultant semi-active system is reliable because it can only dissipate energy.

Work on the lateral vibration reduction of elevators using semi-active actuators includes a hydraulic damper where the damping coefficient is adjusted by controlling the movable orifice lever in a solenoid U.S. Pat. No. 5,289,902. Another system uses a vibration damping device, which is installed between car and frame, and whose damping coefficient can be adjusted according to the elevator speed. Scheduling the damping coefficient merely on the elevator speed limits the effectiveness of attenuating the vibration, U.S. 2009/0308696.

There is a guide roller, whose hardness can be changed with respect to speed of rotation of the roller, by including magnetorheological fluids in the roller. Due to the absence of control mechanism, the achievable performance might be limited, U.S. 2009/0294222. The uses of semi-active actuators with variable stiffness are also described U.S. 2006/0207835, and U.S. 2007/0000732.

SUMMARY OF INVENTION

The embodiments of the invention provides means for reducing lateral vibration in an elevator system using damping devices containing controllable fluids, e.g. magnetorheological (MR) or electrorheological (ER) fluids. Compared to the conventional passive technology, the invention discloses a system and method to suppress a peak resonance in a low frequency without compromising the vibration isolation performance over a mid-range frequency. Thus, the fundamental limitation imposed on the conventional passive architecture are relaxed, and a quality of the ride improves.

This improvement is achieved by adjusting damping coefficients of semi-active actuators according to vibration information and an estimate of the state of the elevator system. This invention provides a system and method, which reduces the requirement of the accuracy of the guide rail installation or alignment. Thus, the installation and maintenance costs can be reduced. By eliminating the requirement of external power, the system cost is reduced, and the reliability issue associated with fully active system is resolved.

This invention provides a system and method for damping lateral vibration of the elevator system. The system can include a roller guider assembly, and a control system for use in the elevator system. The roller guider assembly can include semi-active actuators, and roller guide assembly. The control system can include controllers, filters, sensors, and amplifiers to operate the semi-active actuators.

The semi-active actuator includes a housing, which contains the rheological fluid, and a coil which generates electrical/magnetic fields. The lateral vibration of the car is reduced by adjusting the damping of the semi-active actuators in response to the vibration signals.

Filters, either linear, nonlinear, time-invariant, or time-varying or combinations thereof, are utilized to process the measured vibration signals and provide an estimate of certain elevator states. A controller, either feedback or feedforward, processes inputs indicating a status of the elevator system and the vibration levels. These input signals can be used to determine damping coefficients. The controller outputs the desired damping coefficients, i.e. feedback signals, to the semi-active actuators. The damping of a semi-active actuator is controlled by turning a magnetic signal or an electrical signal ON or OFF.

DETAILED DESCRIPTION OF THE PREFERRED EMBODIMENTS

Figure 1:
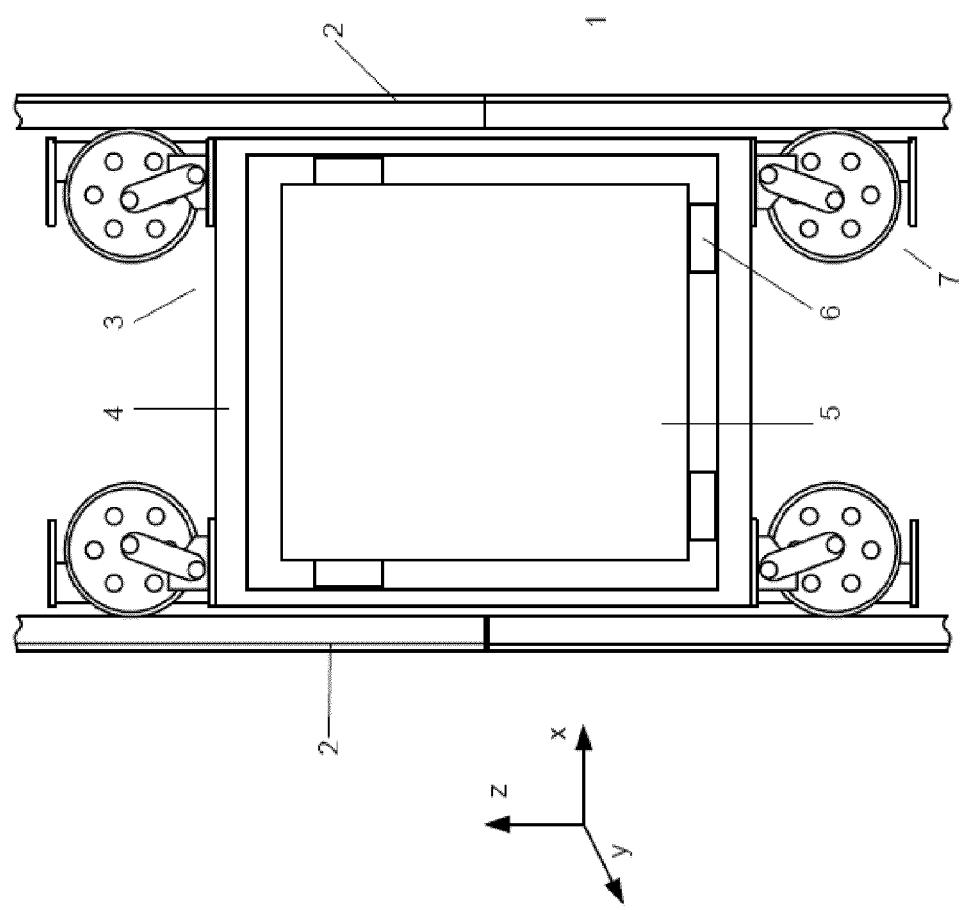
FIG. 1 is a schematic of a portion of an elevator system according to embodiments of the invention.

FIG. 1 shows a portion of an elevator system according to embodiments of our invention. The system includes guide rails 2 installed vertically (z-axis) in an elevator hoistway 1. A frame 3 supports car 4 via a vibration isolating rubbers 6. The frame and car can be moved vertically in the hoistway.

Figure 2:
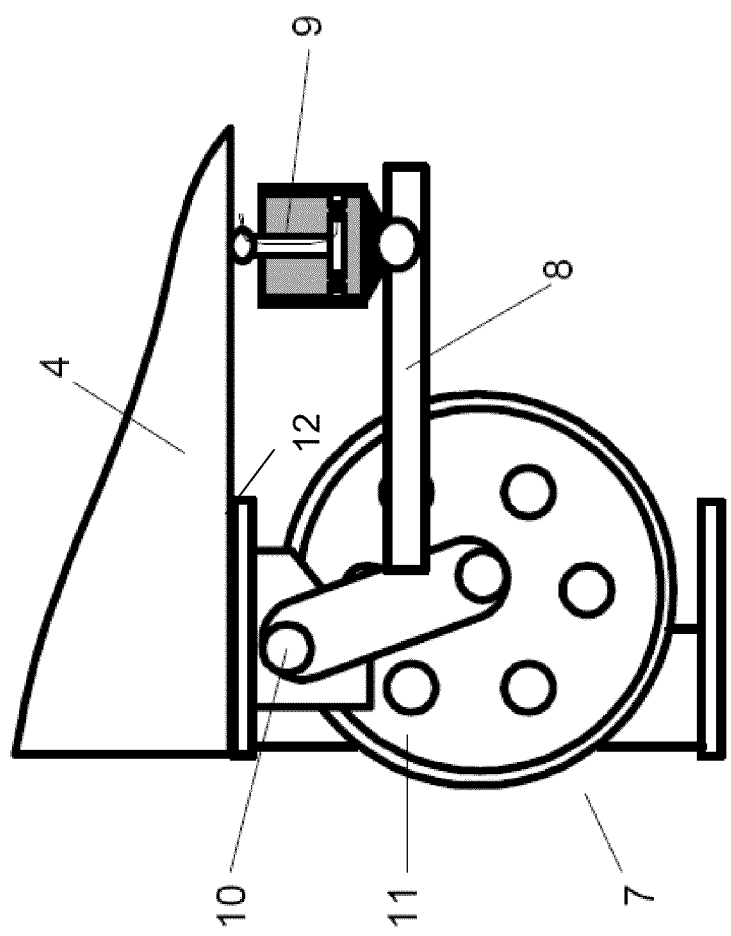
FIG. 2 is a schematic of a roller guider assembly with a linear semi-active actuator according to embodiments of the invention.

As shown in FIG. 2, a roller guide assembly 7 guides the movement of the frame along guide rails. The roller guide assembly includes one or more roller 11 in contact with the guide rails. The rollers are mounted on a base 12 of the frame, and can rotate around a pivot 10 whose axis is either in a left to right direction, or a front to back direction. A rotation arm 8 rotates at the same velocity as the roller.

As shown in FIG. 1, the level variation of guide rails causes the rotation of the roller around the pivot. The rotation of the roller induces the lateral movement of the frame. That is, the car moves in either front to back (y-axis) and/or left to right (x-axis) directions. Damping the relative movements between the roller and the frame, or the frame and the car, can control the car vibration.

A semi-active actuator is installed between one end of the rotation arm and the base. The semi-active actuator generates a force based on a relative lateral movement between the rotation arm and the frame. This force can shape the energy transferred to the frame, and thus damp the vibration of the frame. Consequently, the vibration of the car is also reduced.

In one embodiment, the roller guide assembly includes a linear rheological damper 9, which is arranged between the base of the car and the rotation arm as shown in FIG. 2. The rheological damper can contain magnetorheological (MR) fluids, or an electrorheological (ER) fluids. Generally, flow characteristics of the rheological fluid can be actuated by either a magnetic or electrical signal. For example, the characteristics can instantly change from a free flowing fluid to a semi-solid.

Due to the linear relative velocity between the frame and the end point of the rotation arm, the frame vibration is reduced by selectively adjusting the damping coefficient of the linear MR damper according to the feedback signal.

The MR damper contains MR fluids, which typically include micron-sized, magnetically polarizable particles, such as mineral or silicone oil. Its rheological behavior changes when subject to a magnetic signal, and thus the damping coefficient. The magnetic signal is established by feeding an electrical signal to a coil inside the MR damper. In the absence of the electrical signal, MR fluids exhibit Newtonian-like behavior.

Alternatively, an electrorheological (ER) damper can be used. ER fluids are essentially the electric analog of MR fluids. The behavior of these two types of dampers is very similar except that an electric signal is applied in one case and a magnetic signal in the other.

Figure 3:
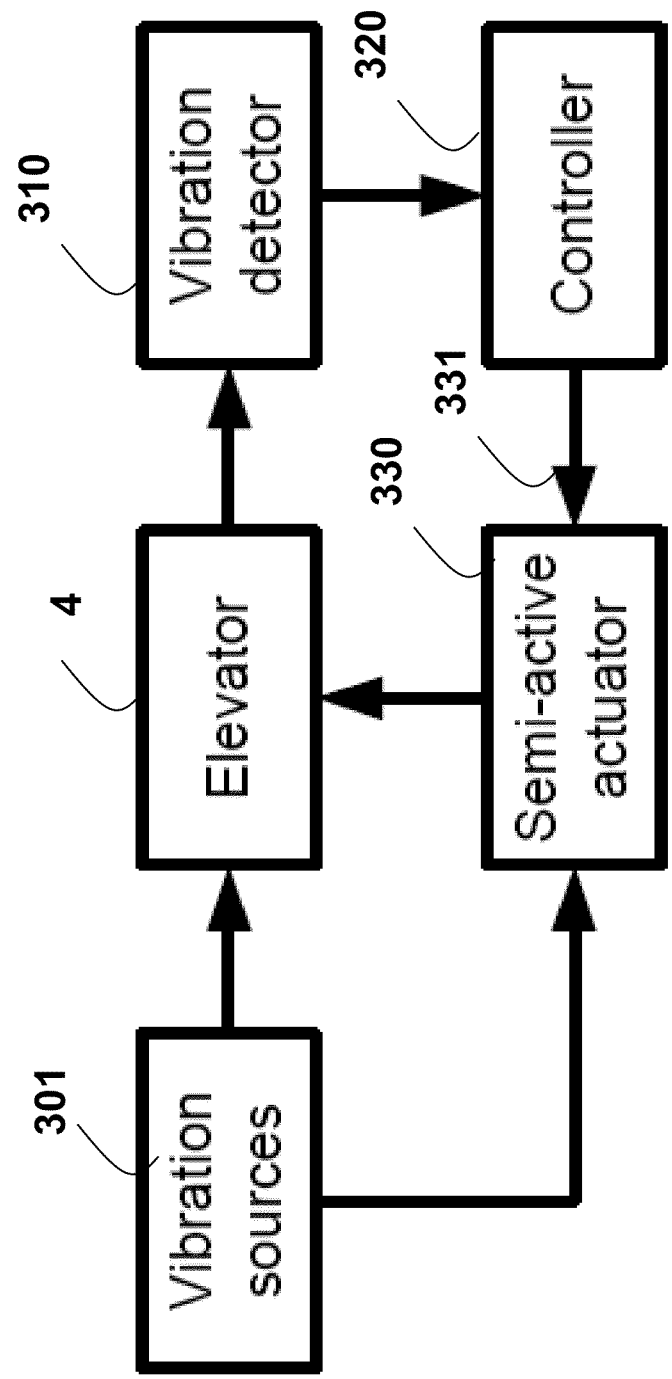
FIG. 3 is a block diagram of the semi-active vibration reduction system according to embodiments of the invention.
Figure 4:
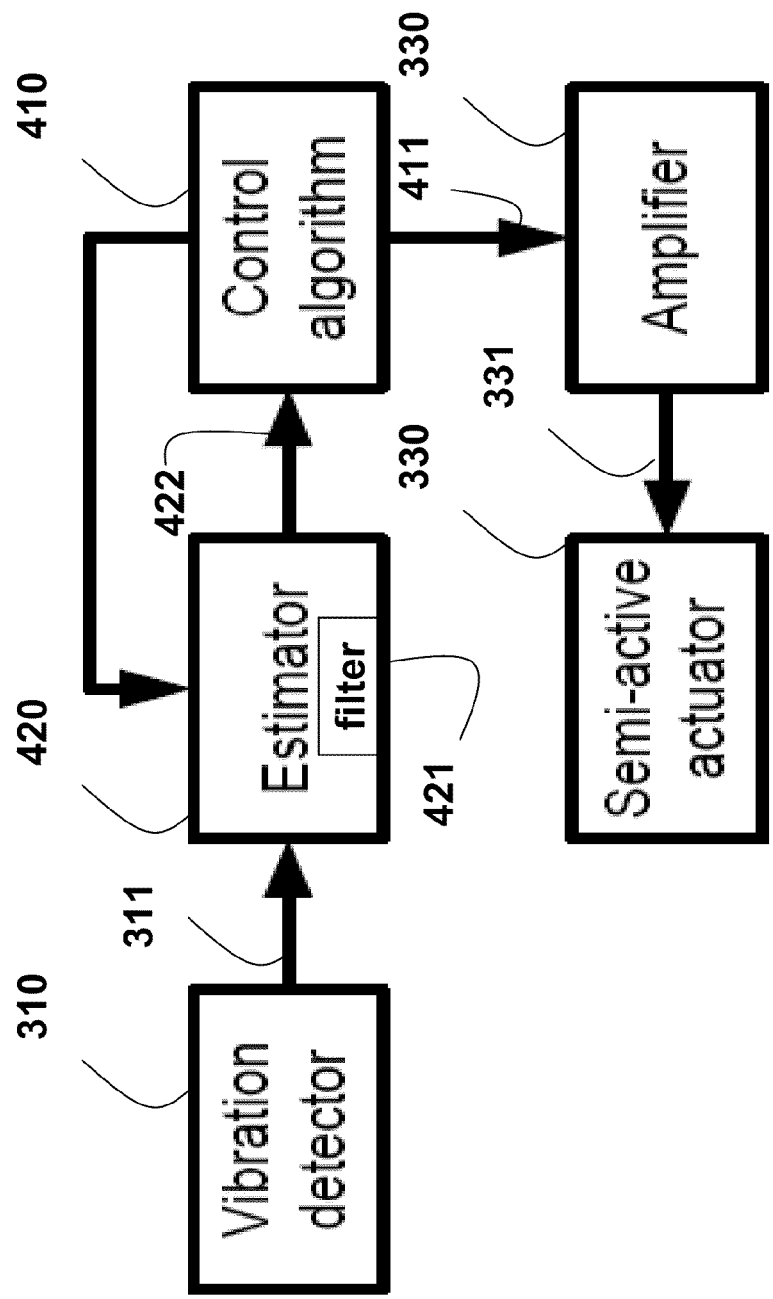
FIG. 4 is a block diagram of a control method according to embodiments of the invention.

FIG. 3 shows the operation of the semi-active vibration reduction system according to embodiments of the invention. Vibration sources 301 transfer vibration to the car 4. The vibration of the car is sensed by a vibration detector 310, which feeds the sensed vibration level signal to a controller 320. The controller determines the desired damping coefficients for the semi-active actuators 330 in a form of a feedback signal 331. The actuator is also subject to the vibration FIG. 4 shows the controller in greater detail. The vibration detector 310 feeds a vibration signal 311 to an estimator 420. The estimator can include a filter 421 (linear, non-linear, time-invariant, or time-varying, or combinations thereof) to filter high frequency noise and low frequency bias in the vibration signal, and an estimator to provide the estimation of certain elevator state. The estimator feeds the filtered vibration signal and estimate of elevator state 422 to a control algorithm 410 according to the invention. The algorithm implement a control law which determines the desired damping coefficients of semi-active dampers. An output of the control algorithm is amplified 430 to the feedback signal 331 which is then fed to the semi-active actuator 330.

The vibration detector can be mounted on either the frame or the car to sense the vibration level. In one embodiment, the detector is an accelerometer. The estimator filters the frequency of vibration level, and determines a state of the elevator system based on the model, inputs and outputs of the elevator system. For example, if the signal is car acceleration, then the estimator can output the estimation of the car acceleration, car velocity, and the like, which can be used by the controller to determine desired damping coefficients for the semi-active actuators.

In the case of the MR damper, the control algorithm can decide 411 to turn the MR damper ON (1) or OFF (0) in response to the vibration information and the elevator state, and output the corresponding signal to the amplifier. To turn the MR damper ON, the amplifier outputs an electric current to the coil of the MR damper. The coil current establishes the required magnetic field to increase the viscosity of MR fluids inside the housing of the MR damper, thus change the damping coefficient of the MR damper. To turn the MR damper OFF, no current is output by the amplifier, thus the damping coefficient of the MR damper is minimal. It should be noted that the (normalized) feedback signal can range continuously for 0 to 1.

In a preferred implementation of ON-OFF control algorithm or "control law" is $$u = \begin{cases} b_{max}, & \varphi(\hat{x}, y)\hat{v} > 0, \\ b_{min}, & \varphi(\hat{x}, y)\hat{v} \le 0, \end{cases}$$

where u the damping coefficient, $b_{max}$ and $b_{min}$ are maximal and minimal damping coefficients, respectively, $\hat{v}$ is an estimate of the relative velocity between the car and roller guide assembly, $\hat{x}$ is an estimation of the state of the elevator system, y is the vibration signal, and $\varphi(\bullet)$ is a function of the vibration signal and the state.

If the vibration detector measures the velocity of the car, then an expression of the function $\varphi(\bullet)$ is $$\varphi(\hat{x}, y) = c_1 \ddot{\hat{x}}_1 + c_2 \ddot{\hat{x}}_2 + \dot{\hat{x}}_2,$$

where $c_1$, $c_2$ are constants, $\ddot{\hat{x}}_1$ is the estimated car acceleration, $\ddot{\hat{x}}_2$ is the estimated frame acceleration, $\dot{\hat{x}}_2$ is the estimated velocity.

Another expression of the function $\varphi(\bullet)$ is to let $c_1$ and $c_2$ be functions of some measurement or the state.

The above expressions of the function $\varphi(\bullet)$ are linear functions of sensed vibration signals of the elevator system. However, the function can be extended to a more general expression to achieve better performance.

Figure 6:
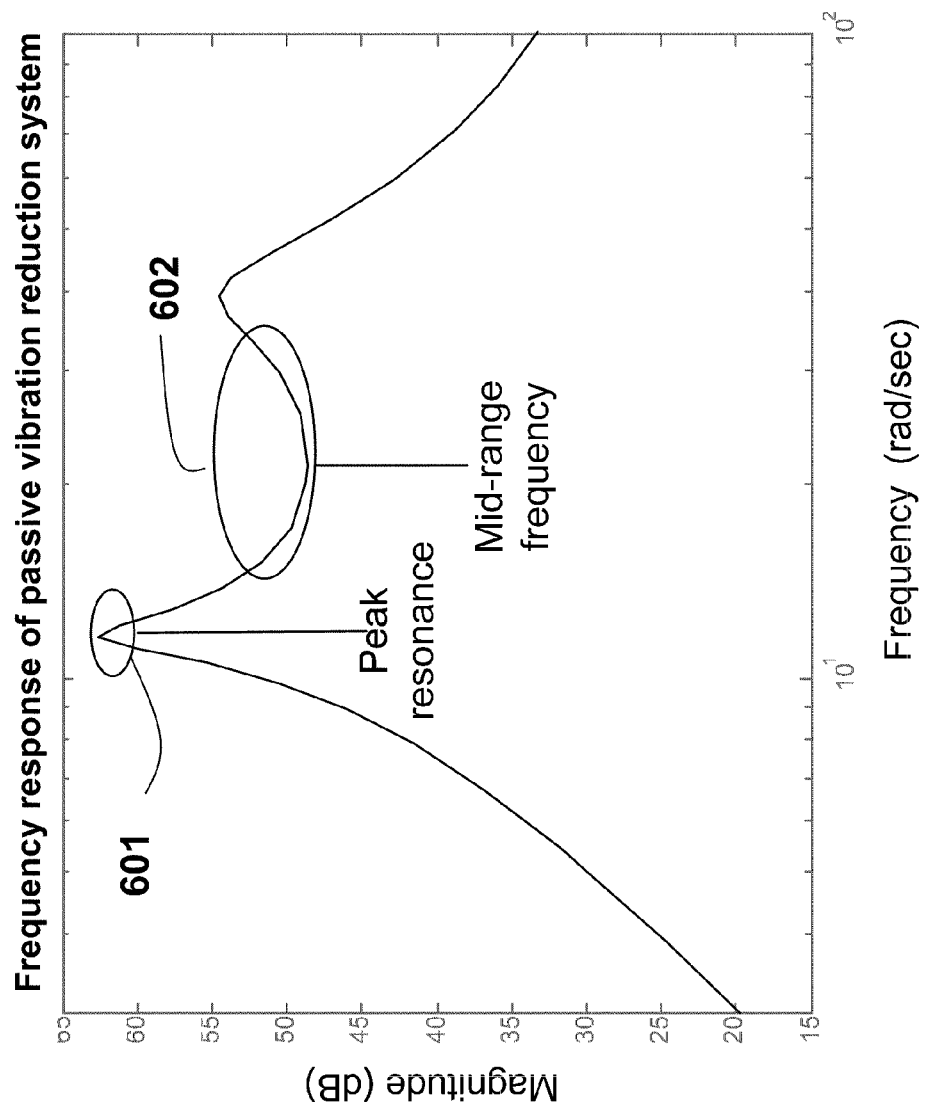
FIG. 6 is a graph of the vibration magnitude as a function of frequency of a prior art passive vibration reduction system for elevators.

FIG. 6 shows a magnitude of the vibration as a function of frequency. The passive vibration reduction system suppresses the peak resonance 601 at the low-frequency and maintain good vibration level in the mid-range frequency 602

Figure 7:
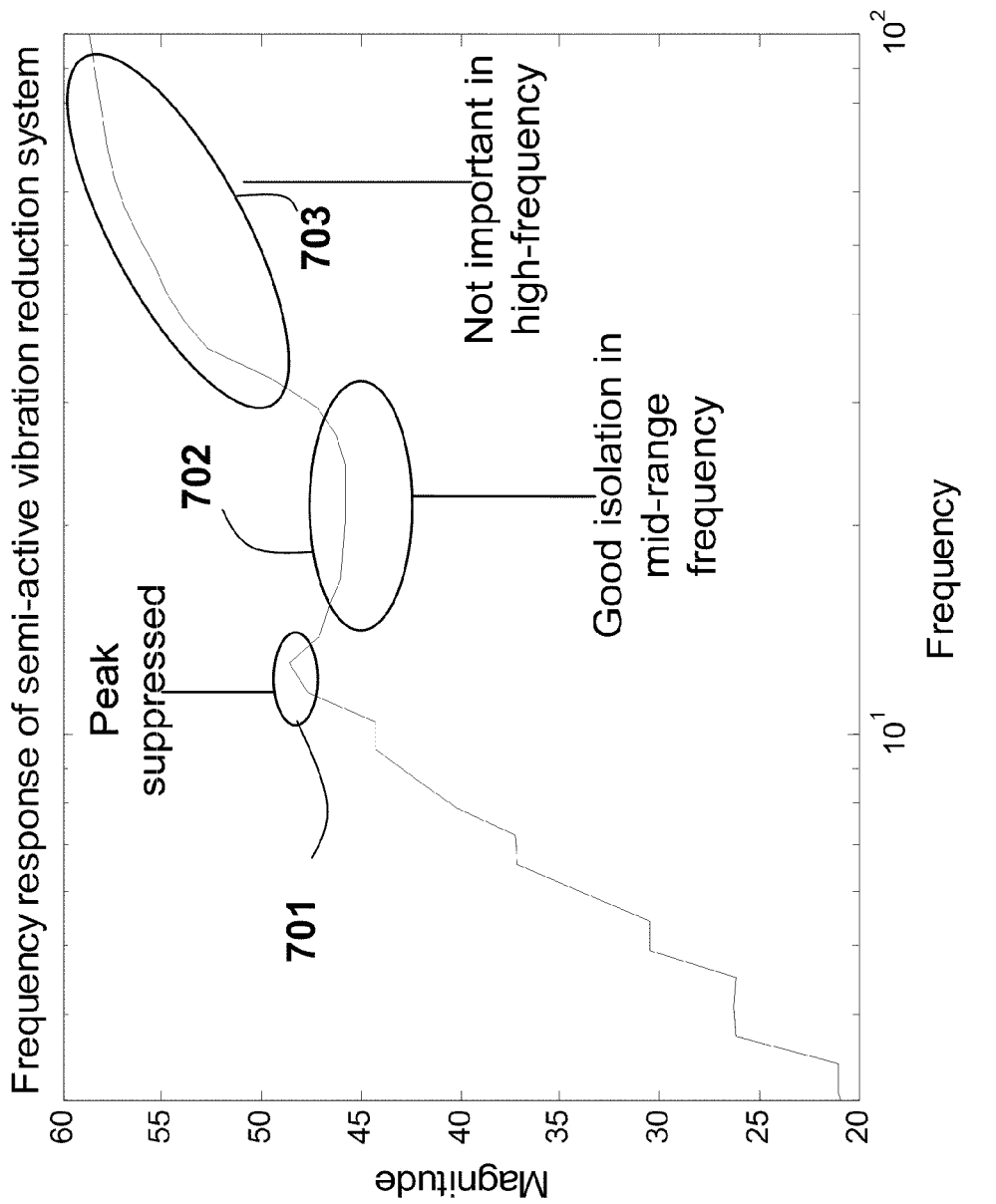
FIG. 7 is a graph of the vibration magnitude as a function of frequency of the semi-active vibration reduction systems according to embodiments of the invention.

FIG. 7 shown the achieved approximate frequency response of the semi-active vibration reduction system with one of preferred expression of φ(•). Peak resonance 701 effectively suppressed without increasing the vibration level of the mid-range frequency 702. Unimportant high-frequency vibration 703 is not affected.

Controllers can be designed to adjust the magnetic field of the MR damper continuously instead of in the ON-OFF manner as described above.

In one example, each controller can be designed to control all semi-active actuators on one roller guide assembly, or control actuators attenuating the vibration in one direction, either right to left (x-axis), or front to back (y-axis). Also, the controller can be designed to operate all the actuators in a centralized manner.

Figure 5:
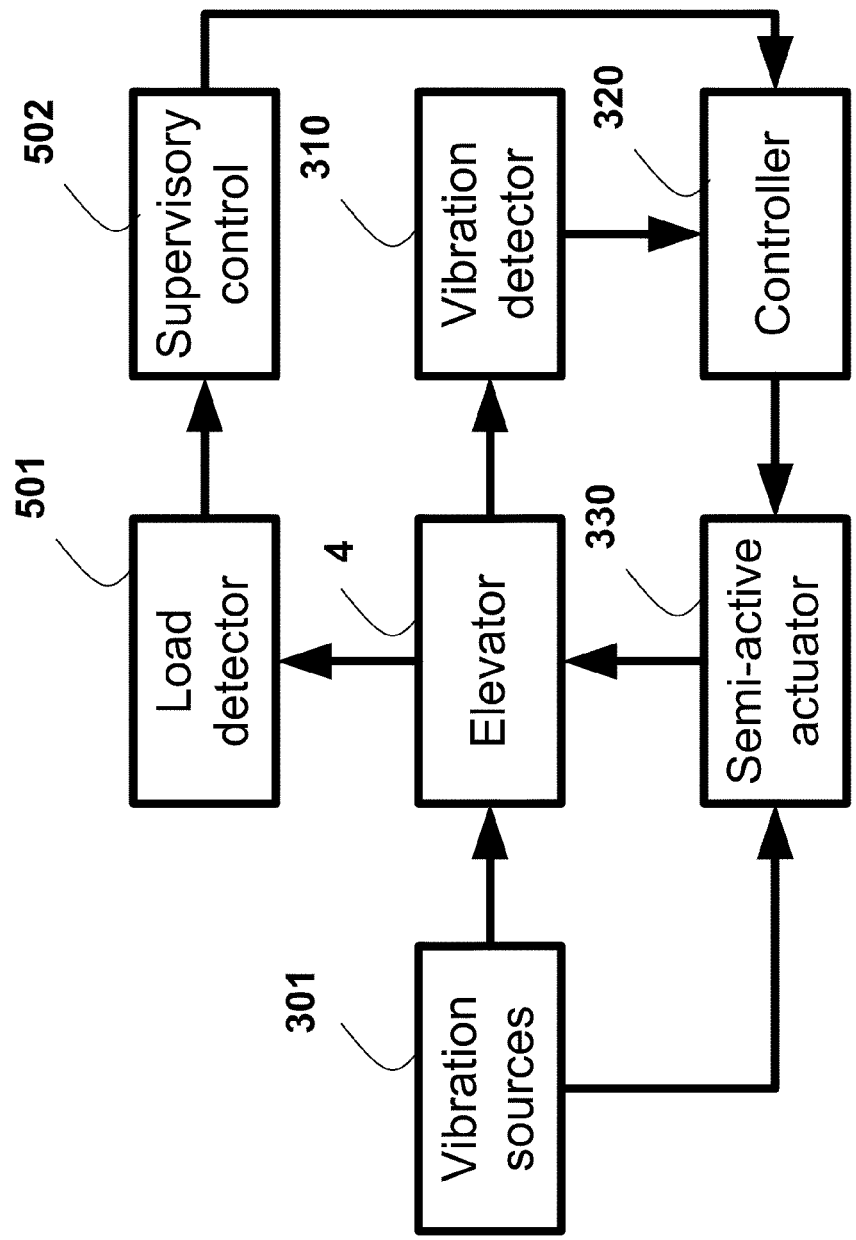
FIG. 5 is a block diagram of the semi-active vibration reduction system according to embodiments of the invention.

As shown in FIG. 5, a structure of the controller can be hierarchical, such that a controller at a higher level in the hierarchy supervises and coordinates controllers at a lower level. This structure includes a load detector 501, a supervisory control 502. The load detector measures the load of the elevator, and outputs the load to the supervisory control. The supervisory control adjusts the parameters of estimators and the lower level controllers to prevent the vibration reduction performance from deterioration because of load. In the hierarchical control structure, the supervisory control does not necessarily depend on the load signal only. It can also depend on other measurements or estimations, such as the elevator velocity, the estimation of the relative velocity between frame and rollers.

Although particular embodiments of the invention, such as the installation of MR dampers on the roller guider assembly, the control architectures and algorithms, the use of different forms of MR dampers, the choice of semi-active actuators as MR dampers, have been described, it is understood that the invention is not limited to these embodiments. For example, ER dampers can be used instead of using MR dampers.

EFFECT OF THE INVENTION

A vibration reduction system is designed to reduce lateral vibration of an elevator car to improve the ride quality. This system includes semi-active actuators, vibration detectors, and control mechanism. Detectors measure the lateral vibration signals of an elevator. The control system processes the measured vibration information, generates the command accordingly, and outputs the amplified electric signal to semi-active actuators. The damping coefficients of semi-active actuators are adjusted by the control system to attenuate the lateral vibration of elevators.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A system for reducing lateral movement of a car in an elevator system, comprising:
    a detector configured to sense vibration of the car as a vibration signal;
    an estimator configured to estimate a state of the elevator system;
    a controller configured to determine a damping coefficient for a feedback signal according to the vibration signal and the state of the elevator system; and
    a semi-active actuator arranged between the car and a roller guide assembly, wherein the semi-active actuator includes a rheological fluid, and flow characteristics of the rheological fluid are actuated according to a feedback signal to reduce a lateral movement of the car, wherein the feedback signal is determine according to a control law $$u = \begin{cases} b_{max}, & \varphi(\hat{x}, y)\hat{v} > 0, \\ b_{min}, & \varphi(\hat{x}, y)\hat{v} \leq 0, \end{cases}$$

where u the damping coefficient, $b_{max}$ and $b_{min}$ are maximal and minimal damping coefficients, respectively, $\hat{v}$ is an estimate of a relative velocity between car and roller guide assembly, $\hat{x}$ is an estimation of a state of the elevator system, y is the vibration signal, and φ(•) is a function of the vibration signal and the state.

2. The system of claim 1, wherein the rheological fluid is magnetorheological, and the feedback signal is magnetic.

3. The system of claim 1, wherein the rheological fluid is electrorheological, and the feedback signal is electric.

4. The system of claim 1, wherein the estimator further comprising:
    a filter configured to remove high frequency noise and low frequency bias from the vibration signal.

5. The system of claim 4, wherein the filter is linear, non-linear, time-invariant, time-varying, or combinations thereof.

6. The system of claim 1, wherein the feedback signal is amplified.

7. The system of claim 1, wherein the feedback signal is either ON or OFF.

8. The system of claim 1, further comprising:
    a plurality of semi-active actuators, which are centrally controlled.

9. The system of claim 1, further comprising:
    a load detector connected to the car.

10. A method for reducing lateral movement of a car in an elevator system, comprising the steps of:
    sensing vibration of the car as a vibration signal;
    estimating a state of the elevator system;
    determining a damping coefficient for a feedback signal according to a sign of a product of an estimate of a relative velocity between car and a roller guide assembly and a function of the filtered vibration signal and the state of the elevator system; and
    actuating a semi-active actuator arranged between the car and a roller guide assembly, wherein the semi-active actuator includes a rheological fluid, and flow characteristics of the rheological fluid are actuated according to the feedback signal to reduce a lateral movement of the car, wherein the feedback signal is either ON or OFF, wherein the feedback signal is determine according to a control law $$u = \begin{cases} b_{max}, & \varphi(\hat{x}, y)\hat{v} > 0, \\ b_{min}, & \varphi(\hat{x}, y)\hat{v} \leq 0, \end{cases}$$

where u the damping coefficient, $b_{max}$ and $b_{min}$ are maximal and minimal damping coefficients, respectively, $\hat{v}$ is the estimate of the relative velocity between the car and the roller guide assembly, $\hat{x}$ is an estimation of the state of the elevator system, y is the vibration signal, and φ(•) is the function of the filtered vibration signal and the state of the elevator system.

11. The method of claim 10, wherein the rheological fluid is magnetorheological, and the feedback signal is magnetic.

12. The system of claim 10, wherein the rheological fluid is electrorheological, and the feedback signal is electric.

13. The method of claim 10, wherein the estimating further comprising:
   filtering high frequency noise and low frequency bias from the vibration signal.

* * * * *